UNITED STATES PATENT OFFICE 2,295,276

PHOTOGRAPHIC EMULSION

Gustav Wilmanns, Wolfen, Kreis Bitterfeld, and Oskar Riester, Dessau-Ziebigk, Germany, assignors, by mesne assignments, to General Aniline & Film Corporation, New York, N. Y., a corporation of Delaware No Drawing. Application June 21, 1939, Serial No. 280,352. In Germany June 23, 1938

3 Claims. (Cl. 95—7)

Our present invention relates to the sensitizing of color photographic emulsions.

It is known that a large number of the best known sensitizers are not suited for sensitizing silver halide emulsions containing color forming development components since their sensitizing action is considerably reduced or completely disappears in the presence of the dyestuff components.

It is therefore an object of the present invention to provide sensitizing dyes, which are unaffected by the color forming development components.

A further object resides in the provision of a photographic light-sensitive element comprising a light-sensitive layer having a color forming development component for purple or blue and a sensitizer for green, which is unaffected by the presence of the color former in the layer.

Further objects will appear from the detailed description following hereinafter.

This invention is based on the observation that the sensitivity in the green region of the spectrum of silver halide emulsions containing color-formers can be increased by using as sensitizers trimethine cyanines which contain at either or each end of the polymethine chain a benzoxazole ring substituted in the 6-position by phenyl. By the 6-position we understand the para-position to the oxygen atom of the benzoxazole ring.

The sensitizing dyestuff can be used alone or with previously described sensitizing dyestuffs. The sensitizing is carried out in the usual manner, a dyestuff component for purple being added to the emulsion at a convenient stage of the preparation of the latter.

The dyestuffs used in the invention have the following general formula:

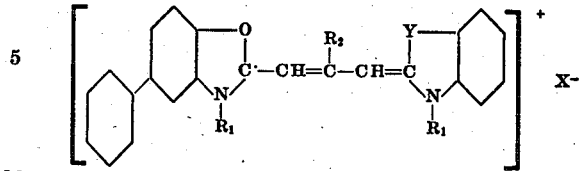

wherein
Y is oxygen, sulfur or selenium,
X is any desired acid radical, for example Cl, Br, I, $ClO_4$, $CH_3SO_4$, or $C_2H_5SO_4$,
$R_1$ is methyl, ethyl, propyl or butyl,
$R_2$ is methyl, ethyl, propyl or butyl.

Moreover in the unsymmetrical dyestuffs the benzthiazole or benzselenazole ring can have one or more substituents in the 4-, 5- or 6-position, for example an alkyl radical with 1–5 carbon atoms, an alkoxy radical or a halogen. If Y is oxygen the benzoxazole ring must contain 6-phenyl as a substituent.

The invention is illustrated by the following examples:

Example 1

The symmetrical trimethine cyanine produced from 2-methyl-6-phenylbenzoxazole diethyl sulphate and orthoacetic acid ethyl ester in pyridine, having the formula

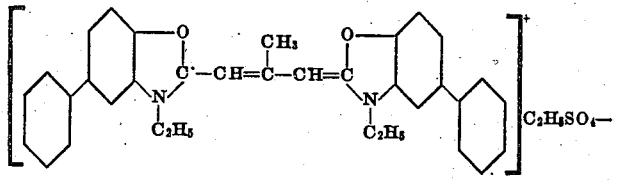

is added to a silver halide emulsion which contains a dyestuff component for purple or yellow.
Sensitization maximum: about 545 mµ.

Example 2

The symmetrical trimethine cyanine of the formula

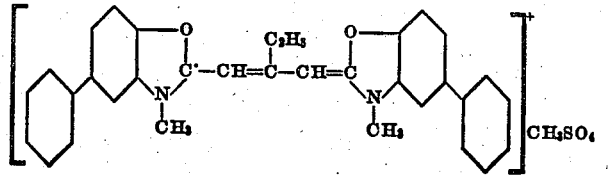

is obtained by condensing in pyridine 2-methyl-6-phenyl-benzoxazole dimethyl sulphate with α-phenylimino-α-methylthiopropane of the following formula

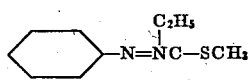

The dyestuff is added to a silver halide emulsion containing a dyestuff component for blue or purple.

Sensitization maximum: 550 mμ.

Example 3

From the intermediate product obtained as described in British Patent No. 412,309 and having the following formula

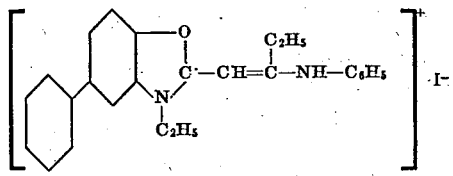

there is obtained by condensation with 2-4:6-trimethylbenzthiazole ethyl iodide an unsymmetrical trimethine cyanine having the following formula:

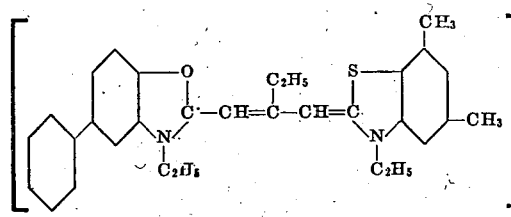

This dyestuff is added to a silver halide emulsion which contains a color-former for purple.

Sensitization maximum: about 585 mμ.

Example 4

The intermediate product used in Example 3 but with methyl instead of ethyl in the chain, is condensed with 2:5:6-trimethylbenzthiazole toluene ethyl sulphate to produce the dyestuff having the following formula:

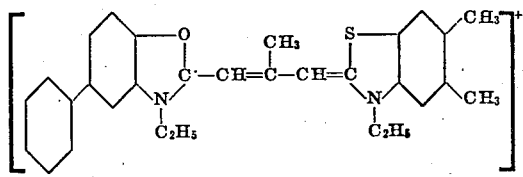

This dyestuff is added to a silver halide emulsion which contains a color-former for purple.

Sensitization maximum: about 565 mμ.

Example 5

The intermediate product used in Example 4 is condensed with 2-methylbenzselenazole diethyl sulphate to produce a dyestuff having the following formula:

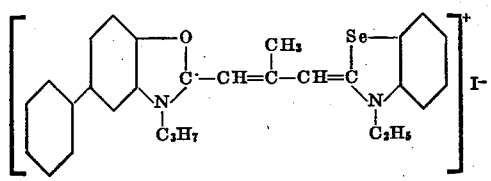

which is precipitated as the iodide. This dyestuff is added to a silver halide emulsion which contains a color-former for purple.

The dyestuff component for purple in the silver halide emulsions in Examples 1, 2 and 3 is 1-phenyl-3'-carboxylic acid-3:4''-abietyl-aminophenyl-5-pyrazolone; in Example 4 it is 4:4'-diphenylcarboyl-3-(4''-aminophenyl)-1-(para-3'-benzthiazole-2'-phenyl)-5-pyrazolone; and in Example 5 it is the condensation product of cholatrienic acid chloride and 1:3'-amino-5'-sulphophenyl-3-methyl-5-pyrazolone.

We claim:

1. A photographic material comprising a light-sensitive silver-halide emulsion layer containing a purple color forming development component derived from a 5-pyrazolone and a sensitizer consisting of a dyestuff of the following general formula:

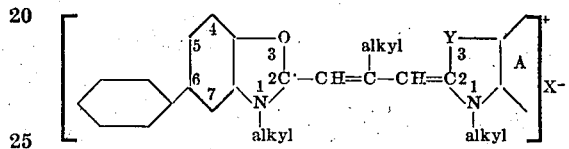

wherein Y is a member of the group consisting of oxygen, sulfur and selenium, X is an anion and A is a member of the class consisting of benzo, alkyl benzo, phenyl benzo, alkoxy benzo and halogen benzo, the substituents on the benzo group being in a position of the class consisting of the 4-, 5- and 6-positions, A always being phenylbenzo with the phenyl group in 6-position when Y is oxygen.

2. A photographic material comprising a light-sensitive silver-halide emulsion layer which contains a purple color-forming development component derived from a 5-pyrazolone and as a sensitizer a dyestuff of the following general formula:

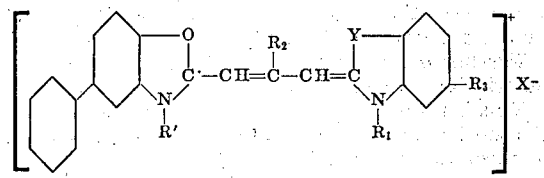

wherein

Y is a member of the group consisting of oxygen, sulfur and selenium
X is an anion
$R_1$ and $R_2$ are alkyl radicals, and
$R_3$ is phenyl.

3. A photographic material comprising a light-sensitive silver halide emulsion layer which contains a purple color forming development component derived from a 5-pyrazolone and as a sensitizer a dyestuff of the following general formula:

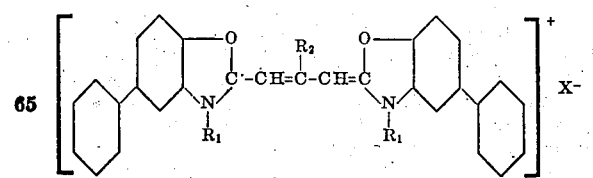

$R_1$ and $R_2$ being alkyl radicals.

GUSTAV WILMANNS.
OSKAR RIESTER.

Certificate of Correction

Patent No. 2,295,276. September 8, 1942.

GUSTAV WILMANNS ET AL.

It is hereby certified that error appears in the printed specification of the above numbered patent requiring correction as follows: Page 2, first column, lines 5 to 8 inclusive, strike out the formula and insert instead

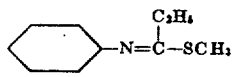

and that the said Letters Patent should be read with this correction therein that the same may conform to the record of the case in the Patent Office.

Signed and sealed this 16th day of March, A. D. 1943.

SEAL]

HENRY VAN ARSDALE,
*Acting Commissioner of Patents.*